United States Patent

[19]

Bes

[11] Patent Number: 5,850,406

[45] Date of Patent: Dec. 15, 1998

[54] METHOD FOR DETECTING AND COMPENSATING FOR MISSING AND/OR INCORRECTLY INSERTED CELLS IN THE ASYNCHRONOUS TRANSFER METHOD (ATM)

[75] Inventor: Hugo Bes, Westerlo, Belgium

[73] Assignee: Siemens Aktiengesellschaft, Munich, Germany

[21] Appl. No.: 930,093

[22] PCT Filed: May 24, 1996

[86] PCT No.: PCT/EP96/02255

§ 371 Date: Nov. 11, 1997

§ 102(e) Date: Nov. 11, 1997

[87] PCT Pub. No.: WO94/39003

PCT Pub. Date: Dec. 5, 1996

[30] Foreign Application Priority Data

Jun. 2, 1995 [BE] Belgium ................................. 9500487

[51] Int. Cl.⁶ ...................................................... G06F 11/60
[52] U.S. Cl. ............................................................ 371/57.1
[58] Field of Search ................................... 391/57.1, 5.5, 391/20.1, 20.2, 20.6; 370/105.1, 107

[56] References Cited

U.S. PATENT DOCUMENTS 5,163,057   11/1992   Grupp .

FOREIGN PATENT DOCUMENTS 0 570 813   11/1993   European Pat. Off. .

OTHER PUBLICATIONS

Patent Abstracts of Japan –JP 6085834 –Mar. 25, 1994 vol. 18, No. 342 (E–1570).

*Primary Examiner*—Vincent P. Canney
*Attorney, Agent, or Firm*—Hill & Simpson

[57] ABSTRACT

A method for detecting and compensating for missing and/or incorrectly inserted cells on the reception side in the transmission of ATM cells with an adaptation layer AAL of type 1, the cells being assigned a sequence number and an error detection and correction code which indicates whether or not the sequence number, and additional information dependent thereon, have been transmitted correctly. It is decided on the basis of these data whether a cell is rejected or transmitted on, and whether there are missing or incorrectly inserted cells. A decision regarding the acceptance or the rejection of a received cell is taken directly without waiting for a following cell, while the possible decision as to whether a cell is preceded by one or more missing cells or whether a cell is an incorrectly inserted cell, is taken after the reception of a following cell. In the event that it is decided that the first-mentioned cell is preceded by one or more missing cells, one or more dummy cells with an equal overall number of bytes are inserted between the first-mentioned cell and the aforesaid, following cell. In the event that it is decided that the first-mentioned cell is an incorrectly inserted cell, this incorrectly inserted cell is nevertheless accepted but, for the purpose of compensation, an equal number of bytes of the aforesaid, following cell, and possibly of a cell following that, are rejected.

5 Claims, 1 Drawing Sheet

METHOD FOR DETECTING AND COMPENSATING FOR MISSING AND/OR INCORRECTLY INSERTED CELLS IN THE ASYNCHRONOUS TRANSFER METHOD (ATM)

BACKGROUND OF THE INVENTION

The invention relates to a method for detecting and compensating for missing and/or incorrectly inserted cells on the reception side in the transmission of ATM cells (Asynchronous Transfer Mode cells) with an adaptation layer AAL=ATM Adaptation Layer) of type 1, the cells being assigned a sequence number (with for example a maximum of eight sequence positions) and an error detection and correction code which indicates whether or not the sequence number, and additional information dependent thereon, have been transmitted correctly, and it is decided on the basis of these data whether a cell in rejected or transmitted on and whether there are missing or incorrectly inserted cells.

The asynchronous transfer method (ATM) has been selected by ITU-T an a transport mechanism for B-ISDN broadband communications networks since 1988. Here, the user information in transmitted in cells with a fixed length of 48 bytes, preceded by a head of a length of 5 bytes.

The packaging of the user information into cells in the transmission direction and the extraction of the user information in the reception direction takes place in the ATM adaptation layer (AAL). If the user information comprises a continuous bitstream, for example a PCM voice signal, the adaptation layer of the type 1 is used.

The adaptation layer is divided into two sublayers, namely into a convergence or adaptation sublayer (CS-sublayer) and a segmentation and recomposition sublayer (SAR-sublayer)

On the transmission side, the CS-sublayer collects the user information until it has received 47 bytes. These 47 bytes are transmitted on, together with the sequence number (3 bits) and possibly other information (1 bit) to the SAR sublayer. The SAR sublayer adds an error detection and correction code (4 bits) to the sequence number and to the other information, so that a cell of 48 bytes is produced, which can be transmitted with the aid of the ATM network. Whenever a cell of 47 bytes is transmitted on from the SC sublayer to the SAR sublayer, the sequence number is increased by 1 and may have a value between 0 and 7. The error detection and correction code makes it possible to check on the reception side whether the sequence number and the additional information have been correctly received.

On the receiver side, the SAR sublayer transmits on to the CS sublayer the 47 bytes of user information together with the sequence number (composed of 3 bits), the bit with the additional information dependent on the sequence number, and the state value of the sequence number and the aforesaid bit which indicates whether or not this number and this bit have been correctly transmitted. The SAR sublayer uses the error detection and correction code to determine the state value.

By processing the sequence number of the cells and of the state value, missing or incorrectly inserted cells can be detected. This information can then be further processed in the part of the CS sublayer in which the unequal delay time of the cells in the ATM network is processed.

Such a method for detecting and compensating for missing and/or incorrectly inserted cells is described in an annex of the publication ETS DE/NA-52617 "B-ISDN ATM Adaptation Layer UAAL) specification, type 1" issued by the European Telecommunications Standards Institute (ETSI).

In this known method, two successive cells are analyzed and a decision as to whether a cell is missing or incorrectly inserted is not made until after this analysis has been carried out on the basis of the sequence number of the cell and of the state value. This means that a received cell is initially stored until the following cell is received, and is only afterwards either rejected or further processed. If it is determined that one or more cells have been lost, one or more dummy cells are added for the first of the aforesaid two successive cells, in order to maintain the correct bit number. If the cell in incorrectly inserted, it is destroyed.

The processing thus takes place on a stored cell. This known method is essentially based on a delay time by one cell, since, in order to detect the presence of a missing or incorrectly inserted cell, it is necessary to wait for a subsequent cell.

Whereas such a delay time does not constitute a problem in the case of high-quality audio and video services, since the buffer which handles fluctuations in the delay time of cells on the receiver side takes on average, a plurality of cells, it is however, definitely disadvantageous if a voice channel with a low bit rate is transported by means of an AAL of type 1.

SUMMARY OF THE INVENTION

It is an object of the invention to specify a method for detecting and compensating for missing and/or incorrectly inserted cells in the transmission of ATM cells with an adaptation layer of type 1, which method can also be applied with a voice channel with a low bit rate.

According to the invention, a method is provided for detecting and compensating for missing or incorrectly inserted cells at a reception side for transmission of ATM cells with a type 1 AAL adaption layer. A sequence number and an error detection and correction code are assigned which indicate whether or not the sequence number, and additional information dependent thereon, have been correctly transmitted. Based on use of the error detection or correction code, a decision is made whether a cell is rejected or transmitted on, and whether a cell is missing or whether incorrectly inserted cells are present. For each reception of a cell, with aid of the error detection and correction code assigned to the cell, freedom from errors of the sequence number contained in a respective cell and of the additional information is checked. If freedom from errors is determined, the respective cell is further handled. However, if errors are present, the respective cell is rejected and a comparison is made with reference to a last two successive cells provided to determine whether the sequence numbers contained in the last two successive cells comply with specified sequence. If the comparison reveals a failure of one or more cells, one or more dummy cells are inserted with an equal overall number of bytes between the last two successive cells which have just been compared with one another. If the comparison reveals that for the last two successive cells compared the cell received first has been incorrectly inserted with respect to the sequence number, then the incorrectly inserted cell is nevertheless further handled, but for compensation purposes, an equal number of bytes of the cell received last during the comparison are rejected.

The aforesaid delay time by one cell in avoided. The processing operations take place on the cell which has last arrived.

In order to explain the invention in more detail, a preferred exemplary embodiment of the method in accordance with the invention for detecting and compensating for missing and/or incorrectly inserted cells in the asynchronous transfer mode (ATM) will be described below, reference being made to the appended drawings, in which:

DESCRIPTION OF THE PREFERRED EMBODIMENTS

Figure 1:
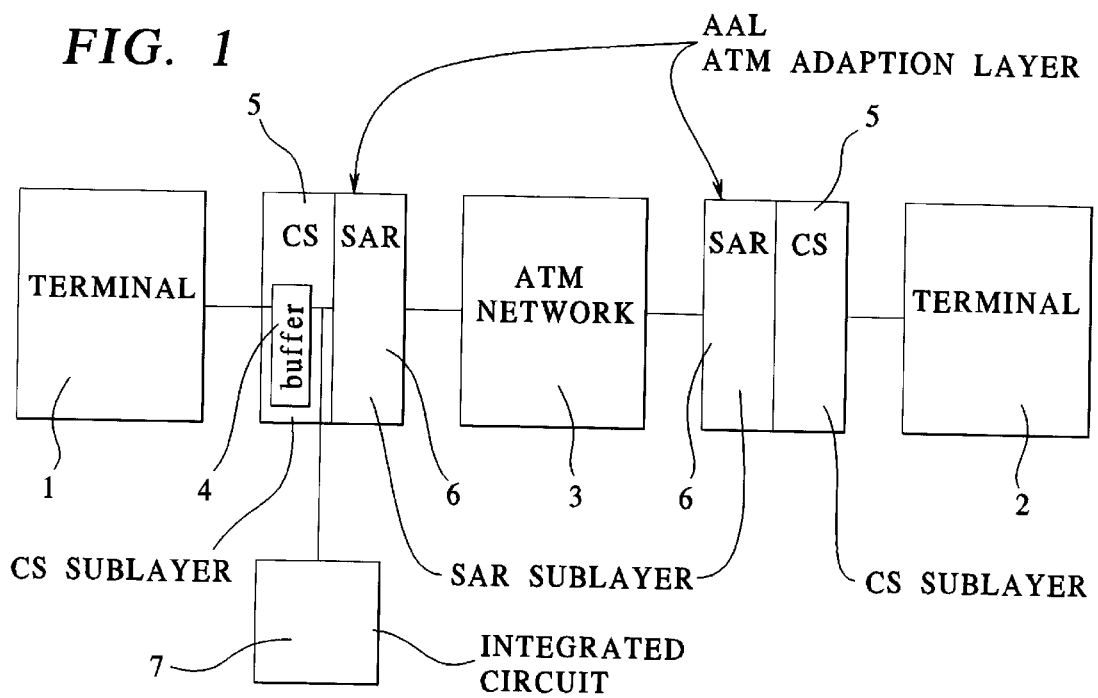
FIG. 1 shows a block diagram of two terminals which are connected by mean of an ATM network.

FIG. 1 illustrates two terminals 1 and 2, for example two terminating control centers. A call, which is present in the form of a continuous bitstream with a bit rate of 64 kbit/s, is transmitted from the terminal 2 to the terminal 1 via the ATM network 3.

For this purpose, between each of the terminals 1 and 2 and the network 3 an ATM adaptation layer or AAL layer 5, 6 of type 1 is inserted, which layer in composed of a convergence or adaptation sublayer (CS sublayer) 5 on the side of the user's terminal, and a segmentation and recomposition sublayer (SAR sublayer) 6 on the side of the ATM network. In order to compare the variable cell delay time through the ATM network, a buffer 4 is provided in the terminal 1 in the CS sublayer.

An integrated circuit 7 for detecting and compensating for missing and/or incorrectly inserted cells in arranged in the terminal 1 between the SAR sublayer 6 and the buffer 4.

This detection and compensation takes place in accordance with the invention in the following fashion.

The information is transmitted, for example, from the terminal 2 to the terminal 1, in the form of 53-byte cells via the ATM network 3.

Each cell, which is supplied to the network 3 on the transmission side of terminal 2 through the CS sublayer via the SAR sublayer 6, is formed of a head with 5 bytes, the cell content (payload) of 47 bytes and one byte with a specific function.

This last-mentioned byte comprises three bits which constitute the sequence number SC (Sequence Count) of the cell, also a bit which supplies additional information as a function of the sequence, for example for the transmission of the frequency and possibly the structure, referred to as a Convergence Sublayer indication or CSI bit, as well as four bits which form the error detection and correction code of the CSI bit and the sequence number SC.

The sequence number SC in a value between zero and seven. The CS sublayer 5 counts the cells which are transmitted to the SAR sublayer 6 up to a maximum value of eight, that is to say starting from the eighth cell the system counts from zero again.

On the reception side, it in checked in the SAR sublayer, with reference to the error detection and correction code, whether the sequence number and the CSI bit have been correctly transmitted. The state value indicates whether or not the transmission has been successful. In the former case, the state value is valid, in the other case the state value is invalid. The SAR sublayer supplies the state value, the CSI bit, the sequence number and the 47-byte user information to the CS sublayer.

The circuit 7 uses the sequence number SC and the state value in order to detect and compensate for missing or incorrectly inserted cells in the SC sublayer.

This detection and compensation takes place without delay.

The decision on the acceptance or rejection of a received cell is taken directly without waiting for a following cell. If a cell is accepted, it in stored for further processing in the buffer 4. If the cell is rejected, it is destroyed.

The decision that one or more missing cells precede a cell or that a cell is an incorrectly inserted cell is taken after the reception of a following cell.

If it is decided that one or more missing cells precede the first-mentioned cell, one or more dummy cells with the same overall number of bytes are inserted between the first-mentioned cell and the previously mentioned second cell.

In the event that it is decided that the first-mentioned cell is an incorrectly inserted cell, this incorrectly inserted cell is accepted, but, for the purpose of compensation, an identical number of bytes of the aforesaid following cell, and possibly of a cell following that, are rejected.

Figure 2:
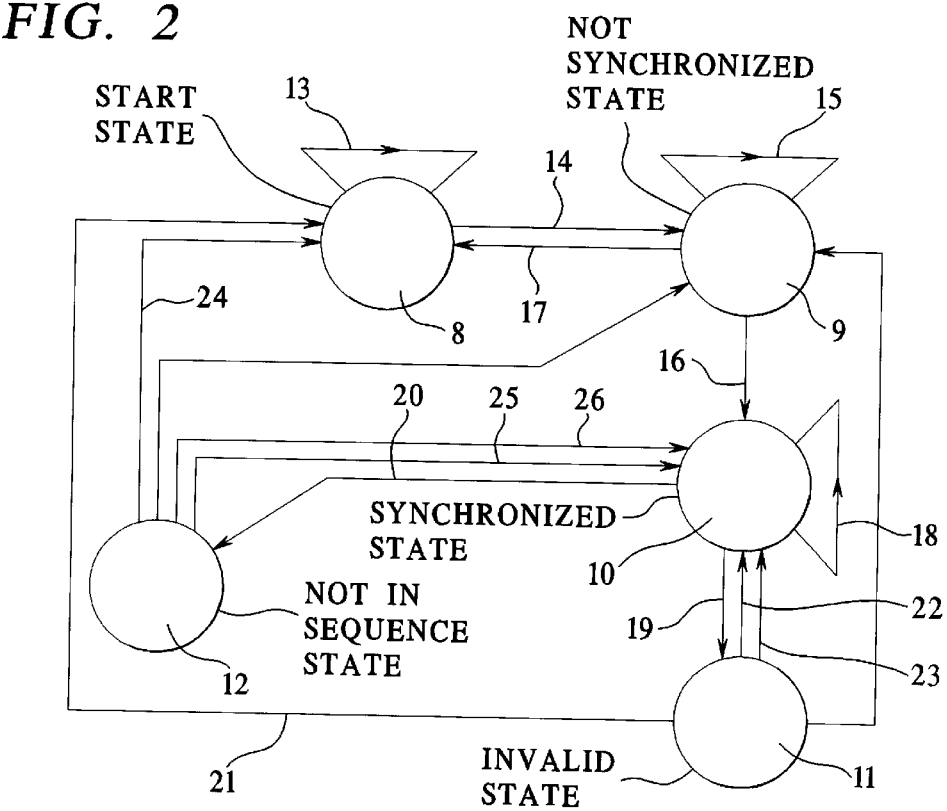
FIG. 2 shown a block diagram with reference to which the method for detecting and compensating for missing and incorrectly inserted cells in accordance with the invention is explained in more detail.

These steps can be described by means of a so-called state machine with five states, as is indicated by the block diagram in FIG. 2, namely state (8) "Start", state (9) "not synchronized", state (10) "synchronized", state (11) "invalid" and state (12) "not in sequence", a line between the states representing the event that is caused by the received cell and which brings about the evolution in the state machine and the handling to which the received cell is directly subjected.

The state (8) "Start" is the initial state. The state machine remains in this state until a valid state value is received. This is represented by the line 13. The cells are rejected.

If the state value is valid, the state machine goes into the state (9) "not synchronized". This is indicated by the line 14.

In this state (9), the following steps are carried out:

If the state value is valid and a sequence number is received which forms a sequence with the previous number, the received cell is accepted and the state machine goes into the state (10) "synchronized". This is indicated by the line 16.

If a cell arrives with an invalid state value, the state machine returns to the position 8 "Start". This is indicated by the line 17.

Once the state machine is in the state (10) "synchronized", the sequence number being indicated as synchronized, the state machine remains in this state as long as the sequence number of a received cell is in sequence with the previous cell. This received cell is accepted. This is indicated by the line 18. In this state (10) the following steps are carried out.

If the state value is invalid, the state machine goes into the state (11) "invalid". This is indicated by the line 19. However, the received cell is accepted.

If the state value is valid and the sequence number is not in sequence with the previous cell, the state machine goes into the state (12) "not in sequence". This is indicated by the line 20. The received cell is accepted.

In the state (11) "invalid", the state machine must take a decision relating to the previously received cell with the invalid state value when it receives the following cell. In this state (11) the following steps take place.

If the state value is invalid again, the state machine returns to the state (1) "Start". This is indicated by the line 21. In this case, the received cell is rejected.

If the state value is valid and the sequence number is in sequence with the last cell received with a valid sequence number, the state machine returns to the state (10) "synchronized". This is indicated by the line 22. However, the previous cell is considered to be an incorrectly inserted cell. The number of bytes of the received cell corresponding to the number of bytes of the incorrectly inserted cell, and possibly of the following received cell, are rejected.

If the state value is valid but has a sequence number which exceeds by two the sequence number of the last cell received with a valid state value, it is assumed that the previous cell is a cell with an incorrect sequence number, although an invalid state value was present. The received cell is accepted and the state machine returns to the state (10) "synchronized". This is indicated by the line 23.

In the state (12) "not in sequence", the following steps are carried out when a cell arrives.

If the state value is invalid, the received cell is rejected and the state machine returns to the state (1) "Start". This is indicated by the line 24.

If the state value is valid and the sequence number forms a sequence with the cell received last, which has a sequence number, the state machine returns to the state (10) "synchronized". This is indicated by the line 25. However, the previously received cell is considered to be an incorrectly inserted cell. A number of bytes which is equal to the number of bytes of the incorrectly inserted cell is rejected from the received cell, and possibly from the following received cell.

If the state value is valid and the sequence number is in sequence with the sequence number of the previous received cell, the state machine assumes that cells are missing. It inserts a number of dummy cells, which is equal to the number of missing cells, between the previous received cell and the cell received last. The cell received last is accepted and the state machine returns to the state (10) "synchronized". This is indicated by the line 26.

If the state value is valid, but is not in one of the two aforesaid states, the state machine rejects the received cell and goes into the state (9) "not synchronized". This is indicated by the line 27.

The previously described method is relatively similar to the aforesaid, known standard method which is presented by ETSI, so that very little has to be changed on the known circuit which is used for the known method, in order to be able to carry out the method according to the invention described above.

According to the invention, missing and incorrectly inserted cells can be detected without it being necessary to delay the cells. Dummy cells are added after the cell which follows a missing cell, and incorrectly inserted cells are accepted, but are compensated for by rejecting the same number of bytes of the cell or cells which follow the incorrectly inserted cell.

Although various minor changes and modifications might be proposed by those skilled in the art, it will be understood that my wish is to include within the claims of the patent warranted hereon all such changes and modifications as reasonably come within my contribution to the art.

I claim as my invention:

1. A method for detecting and compensating for missing or incorrectly inserted cells at a reception side for transmission of ATM cells with a type 1 AAL adaption layer, comprising the steps of:

assigning a sequence number and an error detection and correction code which indicate whether or not the sequence number, and additional information dependent thereon, have been correctly transmitted;

deciding based on use of the error detection and correction code whether a cell is rejected or transmitted on, and whether a cell is missing or whether incorrectly inserted cells are present;

for each reception of a cell, with aid of the error detection and correction code assigned to said cell, checking freedom from errors of the sequence number contained in a respective cell and of said additional information;

if freedom from errors is determined, further handling the respective cell, but if errors are present, rejecting the respective cell and making a comparison with reference to a last two successive cells provided to determine whether the sequence numbers contained in the last two successive cells comply with a specified sequence;

if said comparison reveals a failure of one or more cells, inserting one or more dummy cells with an equal overall number of bytes between the last two successive cells which have just been compared with one another; and if the comparison reveals that for the last two successive cells compared the cell received first has been incorrectly inserted with respect to the sequence number, then the incorrectly inserted cell is nevertheless further handled, but for compensation purposes, rejecting an equal number of bytes of the cell received last during the comparison.

2. The method according to claim 1 wherein for said compensation purposes, also rejecting an equal number of bytes of the cell which follows of the cell received last.

3. The method according to claim 1 wherein the sequence number has a maximum of eight sequence positions.

4. The method according to claim 3 including the steps of:

using the state machine with five states, namely "start", "not synchronized", "synchronized", "invalid", and "not in sequence";

in the initial state "start", rejecting the cells until a valid state value is received, after which the state machine goes into the state "not synchronized";

in the state "not synchronized", rejecting the cells until a sequence number is received which forms a sequence with the previous cell, as a result of which the received cell is accepted and the state machine goes into the state "synchronized";

if a cell arrives with an invalid state value, returning the state machine to the state "start";

in the state "synchronized", accepting the cells as long as the state value is valid and the sequence number of received cells forms a sequence with the previous cells;

if the state value is invalid, having the state machine go into the state "invalid", but the received cell is nevertheless accepted;

if the state value is valid and the sequence number does not form a sequence with the previous cell, having the state machine go into the state "not in sequence", and accepting the received cell is;

in the state "invalid", having the state machine take a decision with respect to a previously received cell with the invalid state value when it receives the following cell, and if the state value is invalid again, returning the state machine to the state "start", rejecting and the state cell in the process;

if the state value is valid and the sequence number forms a sequence with the last cell received with a valid state value, having the state machine returned to the state "synchronized", but the previous cell is considered to be an incorrectly inserted cell, and a number of bytes of the received cell, which is equal to the number of bytes of the incorrectly inserted cell, is rejected;

if the state value is valid but has a sequence number which exceeds by two the sequence number of the last cell received with a valid state value, it is assumed that the previous cell is a cell with an incorrect sequence number although an invalid state value was present, and the received cell is accepted and the state machine returns to the state "synchronized";

in the state "not in sequence", rejecting the received cell if the state value is invalid and returning the state machine to the state "start", but if the state value is valid and the sequence number is in sequence with the last cell received which has a sequence number, returning the state machine to the state "synchronized", and the previously received cell is considered to be incorrectly inserted and a number of bytes corresponding to the number of bytes of the incorrectly inserted cell is rejected from the received cell;

if the state value is valid and the sequence number forms a sequence with the sequence number of the previously received cell, having the state machine assume that cells are missing and inserting a number of dummy cells, which is equal to the number of missing cells, between the previously received cell and into the cell received last, the cell received last being accepted and the state machine returning to the state "synchronized"; and if the state value was valid but the sequence number is not in one of the two previous states, having the state machine reject the received cell and go into the state "not synchronized".

5. A method for detecting and compensating for missing or incorrectly inserted cells at a reception side for transmission of ATM cells, comprising the steps of:

assigning a sequence number and an error detection and correction code which indicates whether or not the sequence number, and additional information dependent thereon, have been correctly transmitted;

deciding based on use of the error detection and correction code whether a cell is rejected or transmitted on, and whether a cell is missing or whether incorrectly inserted cells are present;

for each reception of a cell, with aid of the error detection and correction code assigned to said cell, checking freedom from errors of the sequence number contained in a respective cell and of said additional information;

if freedom from errors is determined, further handling the respective cell, but if errors are present, rejecting the respective cell and making a comparison with reference to a last two successive cells provided to determine whether the sequence numbers contained in the last two successive cells comply with a specified sequence;

if said comparison reveals a failure of one or more cells, inserting one or more dummy cells with an equal overall number of bytes between the last two successive cells which have just been compared with one another; and if the comparison reveals that for the last two successive cells compared the cell received first has been incorrectly inserted with respect to the sequence number, then the incorrectly inserted cell and rejecting an equal number of bytes of the cell received last during the comparison.

* * * * *